United States Patent Office 3,060,248
Patented Oct. 23, 1962

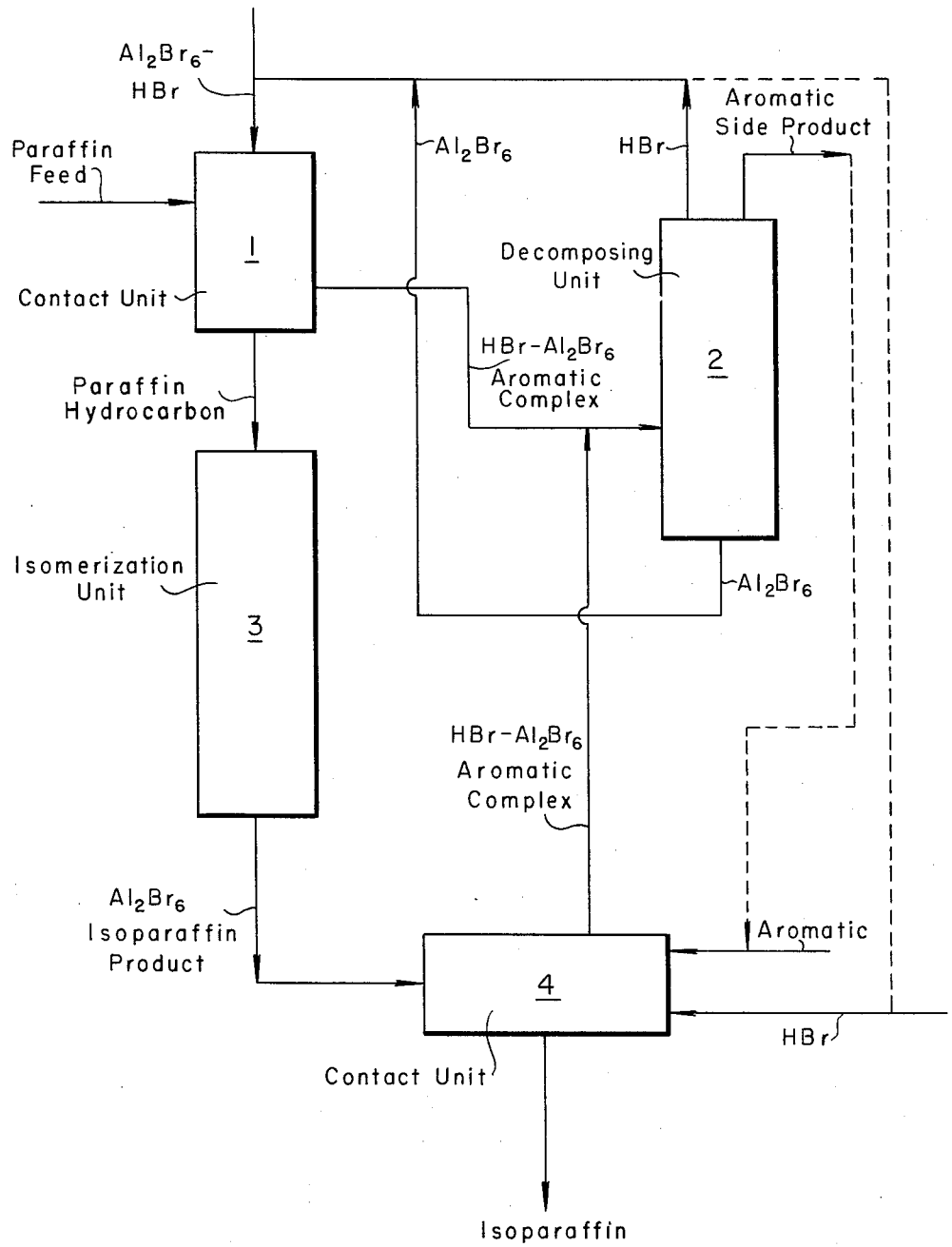

3,060,248
HYDROCARBON CONVERSION PROCESS
Henry A. Holcomb and Walter C. Thompson, Baytown, Tex., assignors, by mesne assignments, to Esso Research and Engineering Company, Elizabeth, N.J., a corporation of Delaware
Filed May 6, 1959, Ser. No. 811,361
14 Claims. (Cl. 260—683.73)

This invention generally concerns a process for converting paraffinic hydrocarbons to isomers thereof. More particularly, the invention concerns pretreating a paraffinic hydrocarbon feed stock prior to isomerization thereof and it may include treatment of the isomerization product.

Certain paraffinic hydrocarbon conversion processes, as, for example, isomerization, employ aluminum halide catalysts. A particularly active conversion catalyst of this nature utilizing co-catalysts is described and claimed in U.S. patent application Ser. No. 781,125, entitled "Hydrocarbon Conversion," filed December 17, 1958, by Walker et al. Preferred co-catalysts of this catalyst system include alcohols, ethers, esters, organic nitrogen compounds, organic acids, anhydrides, inorganic acids, group V oxides, and ketones.

The activity of catalyst system employing aluminum halides, and particularly aluminum bromide, is severely lowered or inhibited by the presence of certain type aromatics, such as benzene, toluene, and xylenes in the isomerization feed stock. The catalyst activity when isomerizing paraffin hydrocarbons in the temperature range of 32° to 250° F. may be reduced from 15 to 100 fold under any given conditions with concentrations of such aromatic hydrocarbons in the paraffin hydrocarbon feed stock as low as 0.5 percent.

The type aromatic compounds which inhibit isomerization catalysis are those which are active for electrophilic aromatic substitution as a class. Such compounds form complex molecular compounds with HBr and $Al_2Br_6$ which are stable at temperatures considerably above ambient temperatures as long as the proper pressure of HBr is present above the complex molecular compound. The complex compound structures are sigma bonded where the aromatic ring is more or less in a protonated form. Since these aromatic compounds are protonated they are very inactive for electrophilic substitution reactions and consequently do not inhibit the activity of the isomerization catalyst. Further, these complex molecular compounds or addition compounds are reversible and by removing the pressure of HBr above them and heating to a selected temperature, they dissociate into HBr, $Al_2Br_6$, and free aromatic compounds.

Briefly, the invention comprises the removal of aromatic hydrocarbons, especially benzene, toluene, and xylene, from an isomerization paraffinic hydrocarbon feed stock, especially hexane and heptane feeds, by contacting the feed stock with $Al_2Br_6$ and HBr under selected conditions of temperature and pressure to form stable complexes of the aromatic hydrocarbon, $Al_2Br_6$, and HBr, which are insoluble in the paraffinic hydrocarbons of the feed stock. The molecular complexes are removed from the feed stock and decomposed reversibly into the aromatic compound, $Al_2Br_6$, and HBr. The $Al_2Br_6$ and HBr may be recirculated to the contacting zone for further use. The aromatic compounds separated constitute a valuable side product of the process. The process of the invention also includes removing aluminum bromide from the isomerization product by adding to the product aromatic hydrocarbons and HBr in selected amounts and under selected conditions so as to form the insoluble aromatic, $Al_2Br_6$, HBr molecular complex and then separating the complex essentially completely from the isomerization product hydrocarbon. The molecular complex may then be destroyed reversibly and the aromatic hydrocarbon and HBr reused. The aromatic hydrocarbon or the HBr may include that separated from the complex formed during the isomerization feed pretreatment.

Thus, a primary object of the present invention is to provide a process for the removal of aromatic compounds from an isomerization feed stock. A further object of the present invention is to provide a process for the recovery of aluminum bromide from an isomerization product.

The above objects and other objects and advantages of the invention will be apparent from the following description taken in conjunction with the drawing wherein:

The sole FIGURE is a flow diagram of the process of the invention.

As shown in the figure a paraffin hydrocarbon feed stock containing aromatics is introduced into a contacting or mixing unit 1 where the feed stock is contacted with $Al_2Br_6$ and HBr under selected temperature and pressure conditions to form an HBr, $Al_2Br_6$, and aromatic compound molecular complex insoluble in the paraffin hydrocarbons. The molecular complex is separated from the paraffin hydrocarbons and then introduced into a decomposing unit 2 in which under selected temperature and pressure conditions and the withdrawal of HBr pressure, HBr, and $Al_2Br_6$ and the aromatic hydrocarbons are dissociated. The HBr and $Al_2Br_6$ may be recycled to the contacting unit 1 and the aromatic hydrocarbon may be employed as a valuable side product. The paraffin hydrocarbons separated from the molecular complex are introduced to the isomerization unit 3 wherein the paraffinic hydrocarbons are isomerized to the iso-paraffins thereof in the presence of an aluminum bromide catalyst. The isomerized product from the isomerization unit 3 comprising the iso-paraffins and aluminum bromide dissolved therein then are introduced to a contacting unit 4 similar to the contacting unit 1 in which under selected conditions of temperature and pressure and in the presence of HBr and aromatic hydrocarbons, the HBr, $Al_2Br_6$, aromatic molecular complex insoluble in the iso-paraffinic product is formed. The iso-paraffins then are separated from the molecular complex and the molecular complex may be returned to the decomposing unit 2. The separated aromatic side product from the decomposing unit 2 may be employed in the contact unit 4 and also the HBr separated in the decomposing unit 2 may be employed in contact unit 4, as indicated by the dotted lines.

Benzene, the aromatic encountered in hexane feeds, forms complexes which are believed to have the composition $Al_2Br_6$:HBr:$6C_6H_6$, Eley and King, J. Chem. Soc., 2517 (1952). The proper pressure of HBr is that required on the system benzene, hexane, $Al_2Br_6$ to provide HBr:$Al_2Br_6$ in 1:1 mol ratio in the complex phase which is insoluble in the hydrocarbon phase. Enough $Al_2Br_6$ must be present to permit formation of the complex with benzene and this amount of $Al_2Br_6$ is present in a practical isomerization system because the hexane feed to the isomerization zone much contain $Al_2Br_6$ to maintain catalyst activity. The insoluble complex is not stable over about 60° C. The insoluble complex following its withdrawal from the isomerization unit and separation is subjected to reduced pressure to remove HBr; then the remaining material is heated or vacuum distilled to remove benzene from the $Al_2Br_6$. Heating in the presence of HBr causes irreversible reactions of benzene to occur and some loss of $Al_2Br_6$ may occur in the removal of benzene from the complex because of these trace irreversible reactions; however, the quantity of $Al_2Br_6$ involved would be small compared to that in the hexane feed and in the isomerization reactors. For removal of $Al_2Br_6$ from the product, the HBr and benzene preferably are added in excess of that required to form the complex with the $Al_2Br_6$ present. The presence of benzene in the product would not be harmful since the isomerization reactions have been completed.

Toluene, the aromatic encountered in heptane feeds, forms more stable complexes with $Al_2Br_6$ and HBr than does benzene. Two stable forms are indicated HBr: $Al_2Br_6$:6.3 toluene and HBr:$Al_2Br_6$:toluene, Brown and Wallace, J.A.C.S. 6268 (1953). Under operating conditions similar to those discussed supra for benzene, provision should be made for the formation of the first of these complexes. In decomposing the complex, toluene is removed under vacuum until the second complex forms. Additional heating under vacuum releases the HBr and remaining toluene. It may be desirable to recirculate the HBr:$Al_2Br_6$:toluene complex to the feed pretreatment step rather than take the additional trouble to destroy it completely.

Xylenes act in a manner similar to that described for toluene.

It is to be understood that any material which will form a molecular complex with free aromatics in the isomerization feed stock or with the aluminum bromide in the isomerization product may be employed provided that the molecular complexes formed are essentially insoluble in the hydrocarbon feed stock and are capable of being decomposed reversibly into the original component.

Having fully described the nature, objects, and operation of the invention, we claim:

1. A process for treating and isomerizing a paraffinic isomerization feed stock which contains low molecular weight aromatic hydrocarbons comprising reacting the feed stock in a contact zone with $Al_2Br_6$ and HBr to form a stable molecular complex consisting of the aromatic hydrocarbons, $Al_2Br_6$, and HBr insoluble in the paraffinic hydrocarbons in a contact zone; separating the molecular complex from the paraffinic hydrocarbons; decomposing in a decomposing zone the molecular complex into HBr, $Al_2Br_6$, and free aromatic hydrocarbons compound by removal of HBr and heat; and then isomerizing the separated paraffinic hydrocarbons in an isomerization zone in the presence of an aluminum bromide catalyst system.

2. A process as recited in claim 1 wherein the aromatic hydrocarbons in the feed stock includes benzene.

3. A process as recited in claim 1 wherein the aromatic hydrocarbons in the feed stock includes toluene.

4. A process as recited in claim 1 wherein the aromatic hydrocarbons in the feed stock includes xylene.

5. A process as recited in claim 1 including recycling the $Al_2Br_6$ and HBr decomposed in the decomposing zone to the contact zone.

6. A paraffin isomerization process comprising reacting a feed stock containing paraffinic and low molecular weight aromatic hydrocarbons with $Al_2Br_6$ and HBr to form a stable molecular complex consisting of the aromatic hydrocarbons, $Al_2Br_6$, and HBr insoluble in the paraffinic hydrocarbons in a first contact zone; separating the molecular complex from the paraffinic hydrocarbons; decomposing the molecular complex into HBr, $Al_2Br_6$, and aromatic hydrocarbons by heat and removal of HBr in a decomposing zone; isomerizing the separated paraffinic hydrocarbons in an isomerization zone in the presence of an aluminum bromide catalyst system; reacting the isomerization product with a low molecular weight aromatic hydrocarbon and HBr to form a stable molecular complex of aromatic hydrocarbons, $Al_2Br_6$, and HBr in a second contact zone; and separating the isoparaffinic hydrocarbons from the molecular complex.

7. A process as recited in claim 6 including recycling $Al_2Br_6$ and HBr separated in the decomposing zone to the first contact zone and cycling the HBr, $Al_2Br_6$, and aromatic hydrocarbon molecular complex from the second contact zone to the decomposing zone and also cycling the aromatic hydrocarbons and HBr to the second contact zone from the decomposing zone.

8. A process as recited in claim 6 wherein the aromatic hydrocarbons employed in contacting the isomerization product in the second contact zone include toluene.

9. A process as recited in claim 6 wherein the aromatic hydrocarbons employed in contacting the isomerization product in the second contact zone include xylene.

10. A paraffinic isomerization process comprising reacting a feed stock containing paraffinic hydrocarbons and benzene with $Al_2Br_6$ and HBr to form a stable molecular complex consisting of benzene, $Al_2Br_6$, and HBr insoluble in the paraffinic hydrocarbons in a first contact zone, the HBr and $Al_2Br_6$ being in such quantities as to provide a 1:1 ratio in the complex phase; separating the molecular complex from the paraffinic hydrocarbons; decomposing the molecular complex into HBr, $Al_2Br_6$, and benzene by heat and removal of HBr in a decomposing zone; isomerizing the separated paraffinic hydrocarbons in an isomerization zone in the presence of an aluminum bromide catalyst system; reacting the isomerization product with benzene and HBr to form a stable molecular complex of benzene, $Al_2Br_6$, and HBr, the HBr and $Al_2Br$ being in such quantities as to provide a 1:1 ratio in the complex phase; and separating the isoparaffinic hydrocarbons from the molecular complex.

11. In an isomerization process the steps of isomerizing a paraffinic feed stock in an isomerization zone in the presence of an aluminum bromide catalyst system; reacting the isomerization product with low molecular weight aromatic hydrocarbons and HBr to form a stable molecular complex of aromatic hydrocarbons, $Al_2Br_6$, and HBr in a contact zone; separating the isoparaffinic hydrocarbons from the molecular complex; decomposing the molecular complex into HBr, $Al_2Br_6$, and aromatic hydrocarbons by removal of HBr and heat in a decomposing zone; and cycling the aromatic hydrocarbons and HBr from the decomposing zone to the contact zone.

12. A process as recited in claim 11 wherein the aromatic hydrocarbons include benzene.

13. A process as recited in claim 11 wherein the aromatic hydrocarbons include toluene.

14. A process as recited in claim 11 wherein the aromatic hydrocarbons include xylene.

References Cited in the file of this patent

UNITED STATES PATENTS

| | | |
|---|---|---|
| 2,260,279 | O'Ouville et al. | Oct. 21, 1941 |
| 2,381,434 | Burk et al. | Aug. 7, 1945 |
| 2,395,022 | Sutton et al. | Feb. 19, 1946 |
| 2,415,315 | Walter et al. | Feb. 4, 1947 |

OTHER REFERENCES

Norris et al.: Journal of the American Chemical Society, vol. 62, pp. 1298–1301 (1940).